US012670736B2

(12) United States Patent
Lewis et al.

(10) Patent No.: US 12,670,736 B2
(45) Date of Patent: Jun. 30, 2026

(54) CHARACTER STRING PATTERN MATCHING USING MACHINE LEARNING

(71) Applicant: Microsoft Technology Licensing, LLC, Redmond, WA (US)

(72) Inventors: Richard Patrick Lewis, Lynnwood, WA (US); Anna Lim Murphy, Cambridge, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 303 days.

(21) Appl. No.: 18/155,998

(22) Filed: Jan. 18, 2023

(65) Prior Publication Data

US 2024/0242525 A1    Jul. 18, 2024

(51) Int. Cl.
*G06V 30/00*       (2022.01)
*G06V 10/82*       (2022.01)
*G06V 30/19*       (2022.01)

(52) U.S. Cl.
CPC ........ *G06V 30/19013* (2022.01); *G06V 10/82* (2022.01); *G06V 30/19173* (2022.01)

(58) Field of Classification Search
CPC ............. G06V 30/19013; G06V 10/82; G06V 30/19173; H04L 63/1408; G06N 3/044
See application file for complete search history.

(56) References Cited

U.S. PATENT DOCUMENTS

| | | | | |
|---|---|---|---|---|
| 9,479,526 | B1 * | 10/2016 | Yang | G06F 21/554 |
| 11,159,551 | B2 * | 10/2021 | Lewis | G06F 16/2282 |
| 2020/0059451 | A1 * | 2/2020 | Huang | G06N 5/01 |
| 2021/0141897 | A1 * | 5/2021 | Seifert | G06N 3/09 |

FOREIGN PATENT DOCUMENTS

| | | | | |
|---|---|---|---|---|
| JP | 2002331058 A | * | 11/2002 | G06Q 30/02 |

OTHER PUBLICATIONS

Saxe, et al., Expose: A Character-Level Convolutional Neural Network with Embeddings for Detecting Malicious URLs, File Paths and Registry Keys, arXiv:1702.08568v1, Feb. 27, 2017.*
Wu et al., Convolutional Neural Network with Character Embeddings for Malicious Web Request Detection, IEEE Intl Conf on Parallel & Distributed Processing with Applications, Big Data & Cloud Computing, Sustainable Computing & Communications, S (Year: 2019).*
Sahoo et al, malicious URL detection using ML—a survey arXiv 1701.07179v3 (Year: 2019).*

(Continued)

*Primary Examiner* — Xiao Liu
(74) *Attorney, Agent, or Firm* — Weaver IP L.L.C.

(57)            ABSTRACT

Systems, methods, apparatuses, and computer program products are disclosed herein for determining character strings that share a pattern, even though the pattern is not necessarily known. In particular, character strings of a plurality of character strings are pairwise compared to one or more other character strings of the plurality by a trained model. Each character string pair determined by the trained model to share a pattern is included in a group. After completion of the pairwise comparison, the group includes all character strings of the plurality of character strings that share the pattern.

20 Claims, 7 Drawing Sheets

<u>600</u>

(56) References Cited

OTHER PUBLICATIONS

Opara et al, Look Before You Leap: Detecting Phishing Web Pages by Exploiting Raw URL and HTML Characteristics, arXiv:2011. 04412v1 Nov. 2020.*

Yadav, et al., Detecting algorithmically generated malicious domain names, Proceedings of the 10th ACM SIGCOMM conference on Internet measurement, pp. 48-61, Nov. 2010.*

Saxe, et al., Expose: A Character-Level Convolutional Neural Network with Embeddings for Detecting Malicious URLs, File Paths and Registry Keys, arXiv:1702.08568v1, Feb. 27, 2017 (Year: 2017).*

International Search Report and Written Opinion received for PCT Application No. PCT/US2023/083712, Mar. 28, 2024, 13 pages.

Saxe, et al., "Expose: A Character-Level Convolutional Neural Network with Embeddings for Detecting Malicious URLs, File Paths and Registry Keys," arXiv preprint arXiv, Feb. 27, 2017, pp. 1-18.

Yadav, et al., "Detecting algorithmically generated malicious domain names," Proceedings of the 10th ACM SIGCOMM conference on Internet measurement, Nov. 1, 2010, pp. 48-61.

Yu, et al., "Detecting Malicious Web Requests Using an Enhanced Text CNN," 2020 IEEE 44th Annual Computers, Software, and Applications Conference, Jul. 13, 2020, pp. 768-777.

International Preliminary Report on Patentability received for PCT Application No. PCT/US2023/083712, Jul. 31, 2025, 7 Pages.

* cited by examiner

<u>200</u>

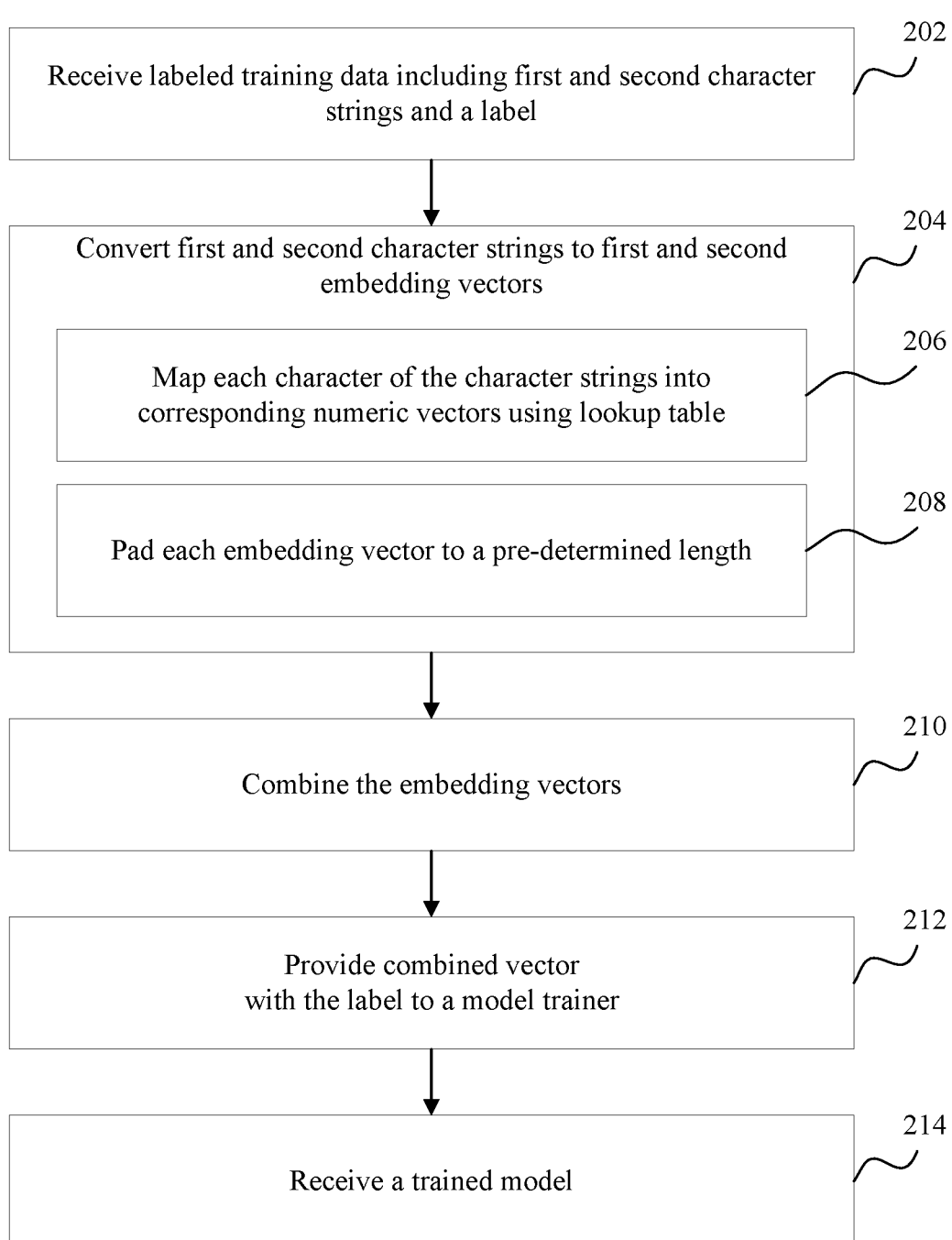

Receive labeled training data including first and second character strings and a label ⟿ 202

Convert first and second character strings to first and second embedding vectors ⟿ 204

Map each character of the character strings into corresponding numeric vectors using lookup table ⟿ 206

Pad each embedding vector to a pre-determined length ⟿ 208

Combine the embedding vectors ⟿ 210

Provide combined vector with the label to a model trainer ⟿ 212

Receive a trained model ⟿ 214

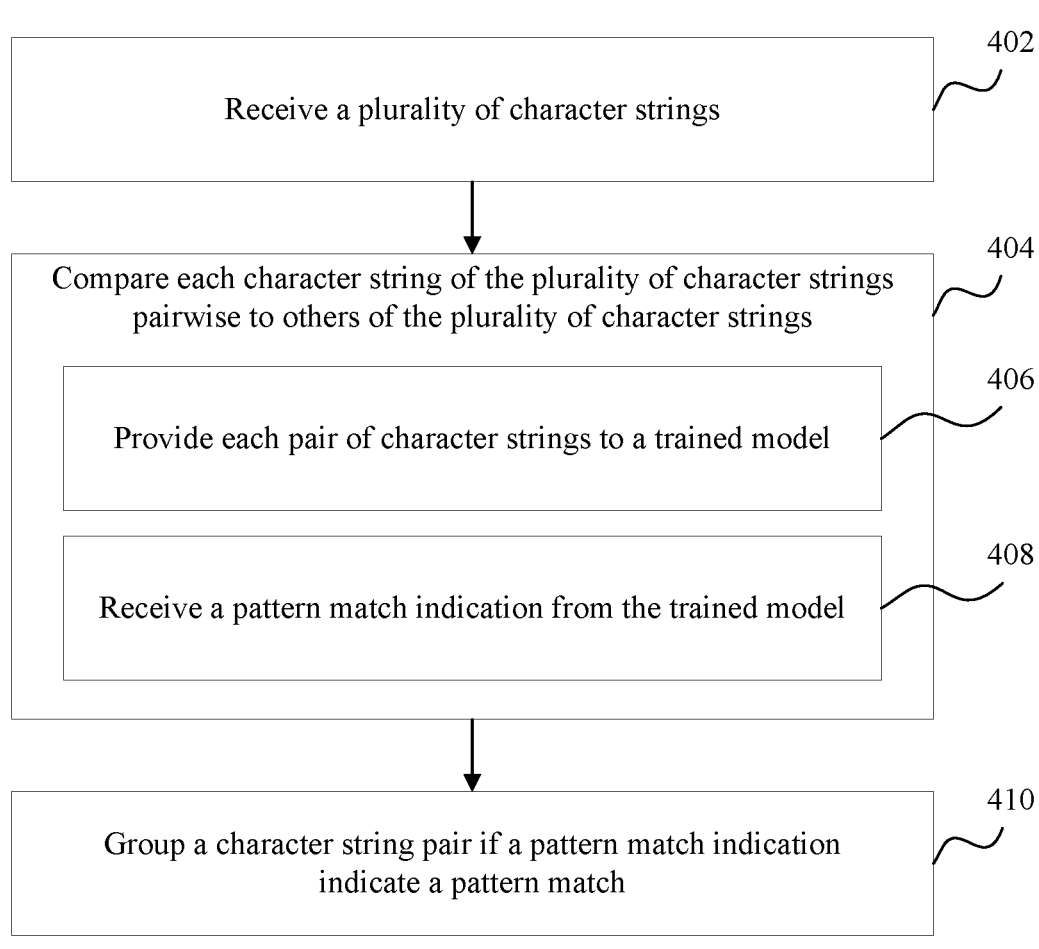

Receive a plurality of character strings                                402

Compare each character string of the plurality of character strings     404
pairwise to others of the plurality of character strings Provide each pair of character strings to a trained model               406

Receive a pattern match indication from the trained model               408

Group a character string pair if a pattern match indication             410
indicate a pattern match

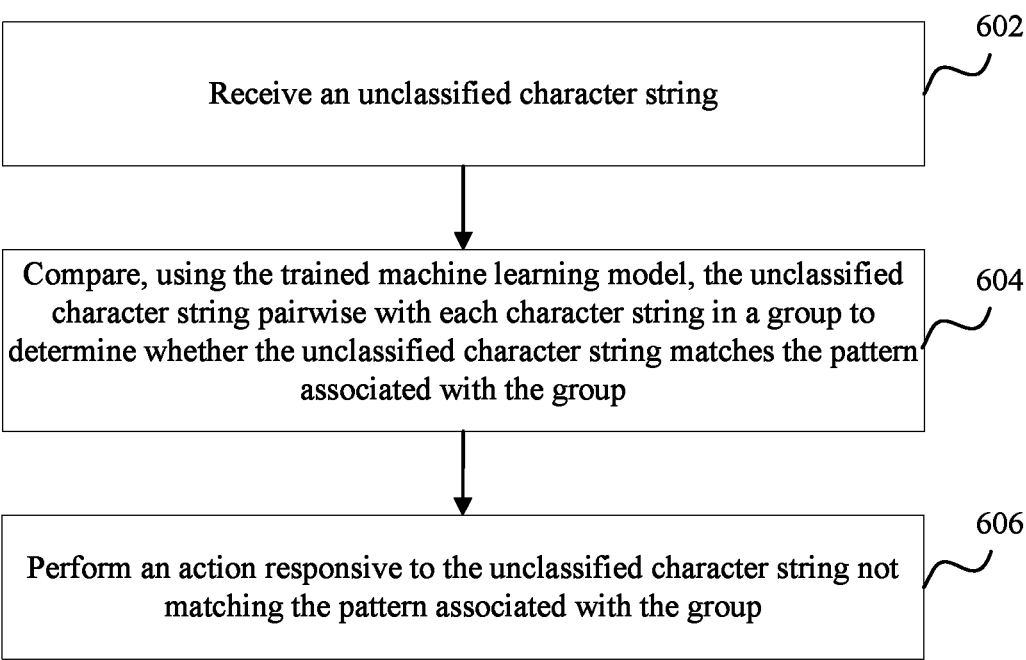

602

Receive an unclassified character string

604

Compare, using the trained machine learning model, the unclassified character string pairwise with each character string in a group to determine whether the unclassified character string matches the pattern associated with the group

606

Perform an action responsive to the unclassified character string not matching the pattern associated with the group

FIG. 6

CHARACTER STRING PATTERN MATCHING USING MACHINE LEARNING

BACKGROUND

New user accounts, including usernames, may be created autonomously in a non-malicious manner by legitimate processes on computer systems. Such usernames may be generated by an automated system and may thus contain predictable patterns (due to the automatic generation) that make them distinguishable from malicious usernames. New user accounts may be generated for malicious purposes, such as to gain unauthorized access to computers and virtual machines. To defend against hostile entities attempting to gain access in this manner, these systems may be monitored for new user accounts, and malicious user accounts are then detected among the new user accounts. According to one technique, malicious and non-malicious new user accounts may be distinguished from each other by automatic pattern recognition.

Current automatic pattern recognition systems utilize prior knowledge of a pattern to find the pattern in input strings. Usually, this pattern is provided to the pattern matching system using regular expressions, also known as "regex," which are sequences of characters that specify a search pattern in text.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed herein for determining character strings that share a pattern, even though the pattern is not necessarily known. In particular, character strings of the plurality of character strings are pairwise compared to one or more other character strings of the plurality by a trained model. Each character string pair determined by the trained model to share a pattern is included in a group. After completion of the pairwise comparison, the group includes all character strings of the plurality of character strings that share the pattern.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 depicts a flowchart of a process for training a machine learning model for pattern matching, in accordance with an embodiment.

FIG. 4 depicts a flowchart of a process for using a machine learning model to group character strings that share a pattern, in accordance with an embodiment.

FIG. 6 depicts a flowchart of a process for using a machine learning model to classify an unclassified character string, in accordance with an embodiment.

Figure 1:
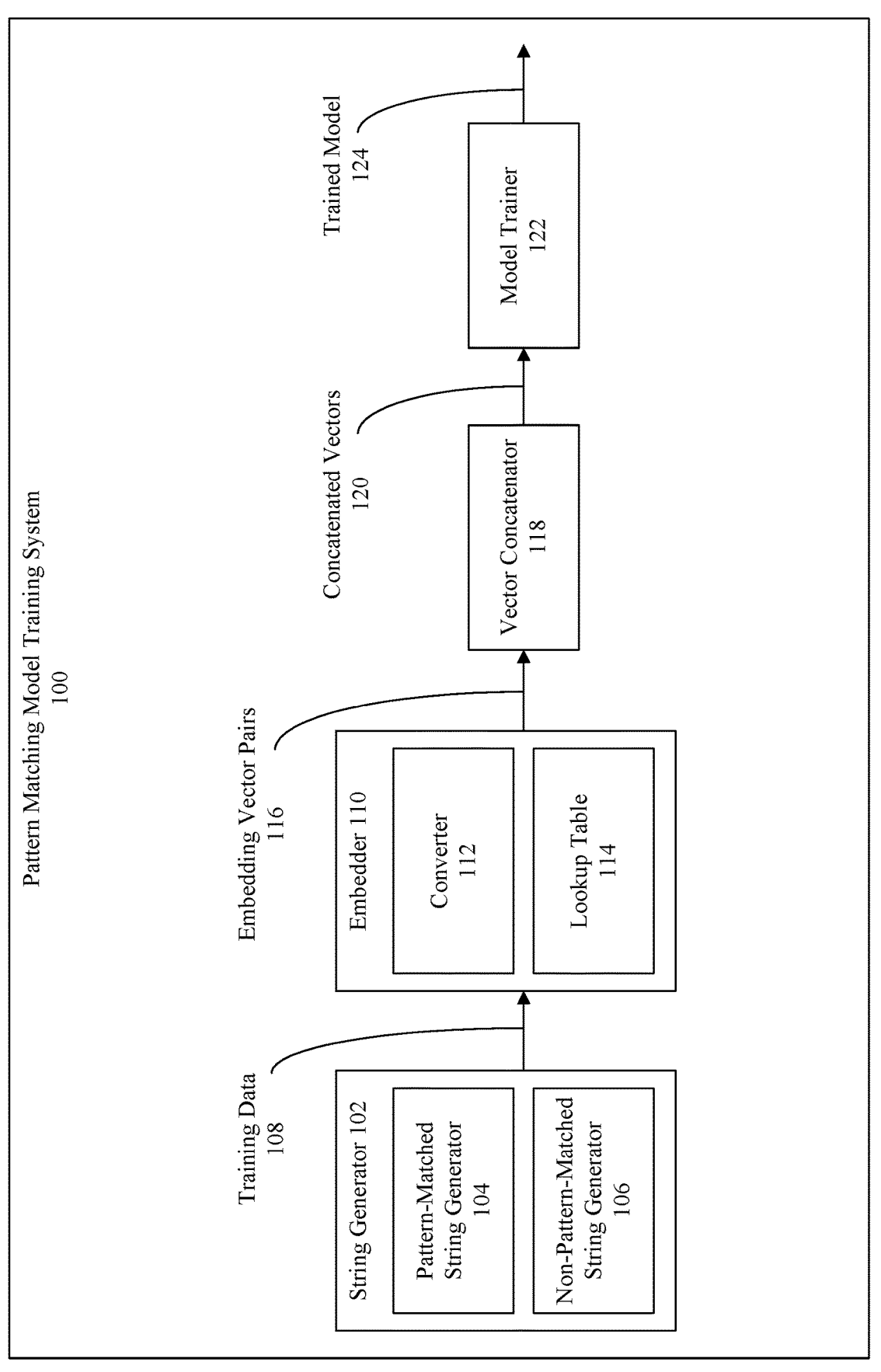
FIG. 1 shows a block diagram of an example system for training a machine learning model for pattern matching, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

As used herein, a "character string" refers to a sequence of characters that comprises alphanumeric characters and may also include symbolic characters (e.g., "$", "&", "*", "@", etc.). A "pattern" refers to a set of elements determinable in a character sequence according to a regular expression.

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

New user accounts may be generated for malicious purposes, such as to gain unauthorized access to computers and virtual machines. To defend against hostile entities attempting to gain system access in this manner, computer systems may be monitored for new user accounts. Then, malicious new user accounts may be distinguished from non-malicious new user accounts using automatic pattern recognition. Current automatic pattern recognition systems require prior knowledge of the pattern. Usually, this pattern is provided to the pattern matching system using regular expressions (also known as "regex"), which are sequences of characters that specify a search pattern in text, and which may be used by string-searching algorithms for find (and find-and-replace) operations on strings, and/or for input validation.

Obtaining prior knowledge of a pattern, however, is sometimes impossible or impractical, such as when a set of character strings is presented without the definition of a pattern contained within. Embodiments disclosed herein enable the automatic determination of character strings that share a pattern even though the pattern may not be previously known.

For instance, a username pattern classifier algorithm is disclosed herein as a platform for detecting shared patterns between usernames and other types of character strings. The pattern classifier algorithm is configured to receive first and second character strings, and to infer whether the first and second character strings share a pattern. The pattern classifier algorithm is based on any of a variety of machine learning model architectures, such as a convolution neural network (CNN), a deep learning neural network, a transformer neural network, a recurrent neural network, a long short-term memory (LSTM) network, etc. For example, a one-dimensional (1D) CNN allows for high accuracy in feature detections between username patterns. The machine learning model according to an architecture may be modified to avoid data overfitting and account for the ASCII (American Standard Code for Information Interchange) characters appearing in the usernames.

In an embodiment, training data for training the machine learning model is generated by an automated process using string generators. The automated process generates, according to a string generator, a pair of random tokens (character strings, such as username placeholders) that share a randomly generated pattern. These randomly generated tokens are labeled as a positive match (e.g., a "1"). The automatic process also produces a corresponding number of random tokens which do not match a pattern and are labeled as a negative match (e.g., a "0"). Using an automated process to generate pairs of random tokens allows for the creation of a large training data set (e.g., thousands, millions, or greater numbers of random tokens) that can be used to train a machine learning model to be accurate to a high degree in detecting character strings that share one or more patterns, without the pattern(s) being known beforehand.

For example, a pattern type may indicate that character strings that share a common substring share a pattern. As another example, another pattern type may indicate that character strings that include a plurality of alphabetical characters followed by one or more numerical characters (e.g., "jimbrown88) share a pattern. Similarly, string generators may employ a plurality of non-pattern types to generate the pair of random tokens that do not share a pattern. For example, a non-shared pattern type may include a first alphabetical character string of "$harkB8" and a second alphanumeric character string of "suesmith", whereas the character strings "jimbrown88" and "suesmith" may be determined to share a pattern (e.g., first and last names in sequence). In some embodiments, the pattern types and non-pattern types may be known types that are provided by a human. Alternatively, the types may be learned from existing data (e.g., a username database) using machine learning techniques.

Note that in some embodiments, the string generators may employ a plurality of pattern types to generate the pair of random tokens that share a pattern, thereby creating training data containing more than one pattern. In this manner, random tokens according to multiple patterns may be used to train a same machine learning model, so that the machine learning model may be capable of detecting character strings that share different patterns.

In an embodiment, concatenated vectors that are each a combination of two normalized characters strings are applied to a machine learning model during training and/or during inference. The use of a concatenated vector allows for known, repeatable input data for the training of, and/or inference by, a machine learning model. In one example, the concatenated vector is composed of two distinct tokens: The first 32 (or other number) elements represent the first token, and the second 32 elements represent the second token. To create this vector, each character of the input string is converted to a binary vector using a lookup table. The lookup table maps a unique ASCII character or symbol to a numeric vector. If a username is composed of less than 32 characters, the length is padded (e.g., vectors of 0s are added to pad the length). The lookup table contains a vector representation of fixed width for every possible character value in an input string. Each value in the vector represents some feature of the input character. In an aspect, vector features consider whether: (a) the character is an alphabetic character (a-z or A-Z), (b) the character is a numeric digit (0-9), (c) the character is a hex value (0-9 or A-F), (d) the character is uppercase, and/or (e) the character value is a symbolic character that is neither a numeric digit nor an alphabetic character. Once each username has been transformed into a vector (e.g., a 32-element vector), the two token vectors are widthwise concatenated to produce a concatenated vector (e.g., a 32-element vector) to be used as input for the model.

These and further embodiments described herein may be used in various pattern matching applications, such as resource group username pattern determination. For instance, the assets of a virtual machine may be partitioned into resource groups. User account names created in a specific resource group (RG) are then collected. A trained pattern matching model may be used to compare each username in the RG with other usernames in same RG. If the model predicts a match, the usernames are grouped together. Usernames may be continually added to a group if they match (share a pattern with) a member of that group (or are determined to share a pattern with a predetermined number of the members of the group). Once historical data has been processed to produce a list of patterns for each RG, new usernames can be processed in real time for patterns shared with the group. Usernames in the group may be indicated as legitimate usernames, while usernames not sharing a pattern with a username group may be indicated as suspect (possibly malicious).

Accordingly, embodiments provide many benefits to pattern matching. With respect to username data, embodiments enable creation of a unique, compact, de-noised representation of username data through a unique vectorization process. The vectorized usernames may be compared using a trained model for shared patterns. Embodiments may be applied as a filtering algorithm to newly received/live input usernames. Such embodiments may be applied to a variety of environments, methods, and systems.

To help illustrate the aforementioned environments, systems, and methods, FIG. 1 is now described. In particular, FIG. 1 is a block diagram of an example pattern matching model training system 100 for training a machine learning model for pattern matching, in accordance with an embodiment. As shown in FIG. 1, pattern matching model training system 100 includes a string generator 102, an embedder 110, a vector concatenator 118, and a model trainer 122. As shown in FIG. 1, string generator 102 further includes a pattern-matched string generator 104, and a non-pattern-matched string generator 106. Furthermore, embedder 110 includes a converter 112, and a lookup table 114. These features of pattern matching model training system 100 are described in further detail as follows.

String generator 102 is configured to generate pairs of character strings for use as training data. In particular, pattern-matched string generator 104 is configured to randomly generate pairs of character strings that share a pattern, and for each pair, to provide a label (e.g., 1) to indicate that the pair shares a pattern. For example, pattern-matched string generator 104 may generate pairs of character strings based on predetermined pattern types. In contrast, non-pattern-matched string generator 106 is configured to generate randomly generated pairs of character strings that do not share a pattern, each pair provided along with a label (e.g., 0) to indicate that the pair does not share a pattern. As shown in FIG. 1, string generator 102 outputs training data 108, which includes the generated pairs of character strings that share patterns and generated pairs of character strings that do not share patterns.

Embedder 110 is configured to receive and vectorize training data 108. In particular, converter 112 of embedder 110 is configured to convert first and second character strings of a received character string pairs into embedding vector pairs 116, which are same length vectors that represent the corresponding first and second character strings. Converting the first and character strings into an embedding vector pair 116 results in a relatively low-dimensional vector that improves machine learning efficiency. Converter 112 may access lookup table 114 for a mapping of each character of a character string to a numeric vector representation of the character, for input into the corresponding generated vector. As such, in some embodiments, lookup table 114 includes a mapping of characters (e.g., ASCII, Unicode, UTF-8, etc.) to numeric vectors of a fixed width. As shown in FIG. 1, embedder 110 generates embedded vector pairs 116, which include vectorized representations of the input first and second character strings of a character string pair of training data 108. In some embodiments, each embedding vector comprises numerical values between −1 and 1, inclusively. In some embodiments, each embedding vector of lookup table 114 corresponds to a unique character in a one-to-one relationship.

Vector concatenator 118 is configured to receive and combine each of the received embedded vector pairs 116, thereby generating concatenated vectors 120, which includes a concatenated vector corresponding to each embedded vector pair of received embedded vector pairs 116. In examples described herein for illustrative purposes, vector concatenator 118 combines embedded vector pairs 116 by concatenating embedded vector pairs 116 widthwise. However, in embodiments, combining may alternatively include, but is not limited to, lengthwise concatenation, an addition operation, a subtraction operation, a multiplication operation, a dot product operation, a cross product operation, and/or any other vector operation or mathematical function that results in a combination of embedded vector pairs 116.

Model trainer 122 receives concatenated vectors 120 (combined in any manner) and is configured to generate a trained model 124 based thereon. Model trainer 122 may be configured to train and generate trained model 124 as any suitable type of machine learning model, including a CNN using 1D or other dimension of convolution layers, a long short-term memory (LSTM) network, one or more transformers, etc. For example, model trainer 122 may receive concatenated vectors 120 along with a label corresponding to each concatenated vector. Some concatenated vectors 120 represent pairs of character strings that share a pattern, while other concatenated vectors 120 represent pairs of character strings that do not share a pattern. With an input of a proportion of pairs of concatenated vectors 120 sharing a pattern (and being correspondingly labeled as such), and a proportion of concatenated vectors 120 not sharing a pattern (and being correspondingly labeled as such), model trainer 122 trains and generates trained model 124 to be able to detect patterns in received character string pairs.

To further illustrate the foregoing features of pattern matching model training system 100, FIG. 2 is described. FIG. 2 depicts a flowchart 200 of a process for training a machine learning model for pattern matching, in accordance with an embodiment. Pattern matching model training system 100 may operate according to flowchart 200 in embodiments. Note that not all steps of flowchart 200 need be performed in embodiments. Further structural and operational embodiments will be apparent to persons skilled in the relevant art(s) based on the following description of FIG. 2. FIG. 2 is described as follows with reference to pattern matching model training system 100 of FIG. 1.

Flowchart 200 begins at step 202. In step 202, labeled training data including first and second character strings and a label are received. For example, embedder 110 may receive training data 108 from string generator 102, which may include character string pairs generated by pattern-matched string generator 104 and non-pattern-matched string generator 106 that each include first and second character strings. The character string pairs generated by pattern-matched string generator 104 share a pattern, while the character string pairs generated by non-pattern matched string generator 106 do not share a pattern.

In step 204, the first and second character strings are converted to first and second embedding vectors. For example, embedder 110 may use converter 112 to convert the first and second character strings of each received pair of character strings (of training data 108) into embedding vector pairs 116. To convert the first and second character strings to first and second embedding vectors, steps 206 and 208 may be performed, which are sub-steps of step 204. In another embodiment, alternative steps may be performed to convert the first and second character strings to the first and second embedding vectors. Steps 206 and 208 of step 204 are described as follows. Upon completion of step 204, operation proceeds to step 210.

In step 206, each character of the character strings is mapped into corresponding numeric vectors using a lookup table. For example, converter 112 may map each character of the first and second character strings received in training data 108 into a numeric vector according to lookup table 114, such as by looking up character-to-vector representations in lookup table 114. For instance, the letter "j" may be mapped to the vector "[0,0,0,0,1,0,1,0]" in lookup table 114, where each character is mapped by lookup table 114 to a numeric vector representation having a vector size of eight (in other embodiments, other vector sizes and alphanumeric representations may be used). The conversion of the first character string results in a first embedding vector having a first dimension (e.g., length) equal to the length of the first character string and a second dimension (e.g., width) equal to the number of digits of the numeric vector conversion for a character. Similarly, the conversion of the second character string results in a second embedding vector having a first dimension equal to the length of the second character string and a second dimension equal to the numeric vector length. For example, the character string of "jimbrown88" may be converted to a non-standardized embedding vector having a length of ten (the number of characters of "jimbrown88") and a width of eight (the size of the numeric vector).

In step 208, each embedding vector is padded to reach a predetermined length. For example, embedder 110 may pad at least the first and/or the second embedding vector using a predetermined padding element (e.g., "[0,0,0,0,0,0,0,0]") until the first and/or second embedding vector is a predetermined length (embedding vectors already at the predetermined length are not padded). By padding each embedding vector to a predetermined length as needed, a common vector length may be used for character-to-character pattern matching. For instance, in the example received character string of "jimbrown88", where the desired embedded vector length is 16 elements, six padding elements are added to the ten vector elements generated from the ten characters of "jimbrown88".

An example of an embedding vector generated for "jimbrown88" is shown in Table 1 below:

filled with padding elements (e.g., "[0,0,0,0,0,0,0,0]") to reach the desired 16-element embedded vector length.

In step 210, the embedding vectors are combined to form a concatenated vector. For example, vector concatenator 118 may receive embedding vector pairs 116 from embedder 110 and combine the corresponding first and second embedding vectors to form concatenated vectors 120. In embodiments, vector concatenator 118 may combine each of the first and second embedding vector pair in various ways, including lengthwise concatenation or widthwise concatenation. However, in other embodiments, combining may include, but is not limited to, addition operation, subtraction operation, multiplication operation, dot product operation, cross product operation, and/or any other suitable vector operation or mathematical function mentioned elsewhere herein or otherwise known.

For instance, Table 2 below shows the embedding vector of Table 1 concatenated with a second embedding vector in a widthwise concatenation:

TABLE 2

| Character Position | First Embedding Vector (for "jimbrown88") | Second Embedding Vector (for "suesmith") | Concatenated Vector |
|---|---|---|---|
| 0 | [0, 0, 0, 0, 1, 0, 1, 0] | [0, 0, 0, 1, 0, 0, 1, 1] | [0, 0, 0, 0, 1, 0, 1, 0, 0, 0, 0, 1, 0, 0, 1, 1] |
| 1 | [0, 0, 0, 0, 1, 0, 0, 1] | [0, 0, 0, 1, 0, 1, 0, 1] | [0, 0, 0, 0, 1, 0, 0, 1, 0, 0, 0, 1, 0, 1, 0, 1] |
| 2 | [0, 0, 0, 0, 1, 1, 0, 1] | [0, 0, 0, 0, 0, 1, 0, 1] | [0, 0, 0, 0, 1, 1, 0, 1, 0, 0, 0, 0, 0, 1, 0, 1] |
| 3 | [0, 0, 0, 0, 0, 0, 1, 0] | [0, 0, 0, 1, 0, 0, 1, 1] | [0, 0, 0, 0, 0, 0, 1, 0, 0, 0, 0, 1, 0, 0, 1, 1] |
| 4 | [0, 0, 0, 1, 0, 0, 1, 0] | [0, 0, 0, 0, 1, 1, 0, 1] | [0, 0, 0, 1, 0, 0, 1, 0, 0, 0, 0, 0, 1, 1, 0, 1] |
| 5 | [0, 0, 0, 0, 1, 1, 1, 1] | [0, 0, 0, 0, 1, 0, 0, 1] | [0, 0, 0, 0, 1, 1, 1, 1, 0, 0, 0, 0, 1, 0, 0, 1] |
| 6 | [0, 0, 0, 1, 0, 1, 1, 0] | [0, 0, 0, 1, 0, 1, 0, 0] | [0, 0, 0, 1, 0, 1, 1, 0, 0, 0, 0, 1, 0, 1, 0, 0] |
| 7 | [0, 0, 0, 0, 1, 1, 1, 0] | [0, 0, 0, 0, 1, 0, 0, 0] | [0, 0, 0, 0, 1, 1, 1, 0, 0, 0, 0, 0, 1, 0, 0, 0] |
| 8 | [0, 0, 1, 0, 0, 0, 1, 0] | [0, 0, 0, 0, 0, 0, 0, 0] | [0, 0, 1, 0, 0, 0, 1, 0, 0, 0, 0, 0, 0, 0, 0, 0] |
| 9 | [0, 0, 1, 0, 0, 0, 1, 0] | [0, 0, 0, 0, 0, 0, 0, 0] | [0, 0, 1, 0, 0, 0, 1, 0, 0, 0, 0, 0, 0, 0, 0, 0] |
| 10 | [0, 0, 0, 0, 0, 0, 0, 0] | [0, 0, 0, 0, 0, 0, 0, 0] | [0, 0, 0, 0, 0, 0, 0, 0, 0, 0, 0, 0, 0, 0, 0, 0] |
| 11 | [0, 0, 0, 0, 0, 0, 0, 0] | [0, 0, 0, 0, 0, 0, 0, 0] | [0, 0, 0, 0, 0, 0, 0, 0, 0, 0, 0, 0, 0, 0, 0, 0] |
| 12 | [0, 0, 0, 0, 0, 0, 0, 0] | [0, 0, 0, 0, 0, 0, 0, 0] | [0, 0, 0, 0, 0, 0, 0, 0, 0, 0, 0, 0, 0, 0, 0, 0] |
| 13 | [0, 0, 0, 0, 0, 0, 0, 0] | [0, 0, 0, 0, 0, 0, 0, 0] | [0, 0, 0, 0, 0, 0, 0, 0, 0, 0, 0, 0, 0, 0, 0, 0] |
| 14 | [0, 0, 0, 0, 0, 0, 0, 0] | [0, 0, 0, 0, 0, 0, 0, 0] | [0, 0, 0, 0, 0, 0, 0, 0, 0, 0, 0, 0, 0, 0, 0, 0] |
| 15 | [0, 0, 0, 0, 0, 0, 0, 0] | [0, 0, 0, 0, 0, 0, 0, 0] | [0, 0, 0, 0, 0, 0, 0, 0, 0, 0, 0, 0, 0, 0, 0, 0] |

TABLE 1

| Character Position | Character String Characters | Embedding Vector |
|---|---|---|
| 0 | j | [0, 0, 0, 0, 1, 0, 1, 0] |
| 1 | i | [0, 0, 0, 0, 1, 0, 0, 1] |
| 2 | m | [0, 0, 0, 0, 1, 1, 0, 1] |
| 3 | b | [0, 0, 0, 0, 0, 0, 1, 0] |
| 4 | r | [0, 0, 0, 1, 0, 0, 1, 0] |
| 5 | o | [0, 0, 0, 0, 1, 1, 1, 1] |
| 6 | w | [0, 0, 0, 1, 0, 1, 1, 0] |
| 7 | n | [0, 0, 0, 0, 1, 1, 1, 0] |
| 8 | 8 | [0, 0, 1, 0, 0, 0, 1, 0] |
| 9 | 8 | [0, 0, 1, 0, 0, 0, 1, 0] |
| 10 | | [0, 0, 0, 0, 0, 0, 0, 0] |
| 11 | | [0, 0, 0, 0, 0, 0, 0, 0] |
| 12 | | [0, 0, 0, 0, 0, 0, 0, 0] |
| 13 | | [0, 0, 0, 0, 0, 0, 0, 0] |
| 14 | | [0, 0, 0, 0, 0, 0, 0, 0] |
| 15 | | [0, 0, 0, 0, 0, 0, 0, 0] |

In Table 1, the generated 16 by 8 embedding vector comprises sixteen numeric vectors of size 8 arranged in a two-dimensional matrix. In particular, the embedded vector rows for character positions 0-9 are the numeric vectors generated from the characters "jimbrown88," and the embedded vector rows for character positions 10-15 are As shown in Table 2, first and second embedding vectors corresponding to first and second character strings "jimbrown88" and "suesmith" are concatenated along the second dimension (widthwise, by row), such that each numeric vector of size 8 of "jimbrown88" is concatenated with (followed by) the corresponding numeric vector of size 8 of "suesmith", with padded elements ("[0,0,0,0,0,0,0,0]") filling out character positions where the character strings fell below sixteen elements.

In step 212, the combined vector and corresponding label are provided to model a trainer. For example, as shown in FIG. 1, model trainer 122 receives concatenated vectors 120 along with their corresponding labels (generated at string generator 102 for their corresponding character string pair) from vector concatenator 118. With respect to the example of Table 2 above, the concatenated vector representation of "jimbrown88" and "suesmith" of Table 2 may be provided to model trainer 122 along with a label of "0" indicating that "jimbrown88" and "suesmith" do not contain a common pattern.

Model trainer 122 is configured to generate trained model 124. Model trainer 122 may be configured to train and generate trained model 124 according to any suitable type of machine learning model, including a CNN using 1D or other dimension of convolution layers, a long short-term memory (LSTM) network, one or more transformers, etc. As shown in FIG. 1, model trainer 122 receives labeled training data in the form of concatenated vectors 120 along with a corresponding label as input. Some concatenated vectors 120 represent pairs of character strings that share a pattern, and have a corresponding pattern matched label (e.g., 1). Other concatenated vectors 120 represent pairs of character strings that do not share a pattern, and have a corresponding non-pattern matched label (e.g., 0).

Model trainer 122 may be configured to iteratively train training model 124 using a first subset of concatenated vectors 120. In some embodiments, backpropagation may be used to improve the accuracy of training model 124 at predicting the presence of a pattern. Example backpropagation techniques that may be utilized include, but are not limited to, gradient descent-based algorithms, stochastic gradient descent-based algorithms, etc.

Model trainer 122 may validate training model 124 using a second subset of concatenated vectors 120. In order to avoid overfitting, validation of a model is performed using a subset of concatenated vectors 120 different from the subset used to train the model. In some embodiments, model trainer 122 may also test the accuracy of trained model 124 using a third subset of concatenated vectors 120.

In step 214, a trained model is received. Based on the accuracy of training model 124 during the validation phase, trained model 124 may be selected and returned as output from model trainer 122, model trainer 122 outputs trained model 124 to be used to determine whether a pair of character strings share a pattern. Trained model 124 may be saved in a file. The file may be loaded into one or more devices to use the model for pattern matching (e.g., during an inference phase to infer whether input pairs of character strings contain a pattern).

In some embodiments, trained model 124 is based on a neural network (NN) model comprising a plurality of neurons (or nodes). Each neuron is associated with a weight, which emphasizes the importance of a particular neuron. The weights of a neural network are learned through training on a dataset. The neural network executes multiple times, changing its weights through backpropagation with respect to a loss function. In essence, the neural network tests data, makes predictions, and determines a score representative of its accuracy. Then, it uses this score to make itself slightly more accurate by updating the weights accordingly. Through this process, a neural network can learn to improve the accuracy of its predictions. Trained model 124 may be based on one or more of a convolutional neural network, or a long short-term memory neural network.

In some embodiments, trained model 124 is a one-dimensional convolutional neural network (1D-CNN) that includes one or more convolutional layers, one or more pooling layers, and one or more fully connected layers. In some embodiments, trained model 124 may also include a flatten layer. Each convolution layer applies sliding convolution filters to the concatenated vectors 120 by moving the filters along the concatenated vectors 120 and computing the dot product of the weights and the concatenated vectors 120. In some embodiments, a bias may be added to the dot product. In some embodiments, the one or more convolution layers may be different. For example, the convolution layers may differ in parameters, such as, for example, kernel size.

In some embodiments, output from the one or more convolution layers may be provided to one or more pooling layers. Pooling layers reduce the dimensions of the features extracted by the convolution layers, thus reducing the overall computation costs. The pooling layers may include, for example, a max pooling layer or an average pooling layer. In some embodiments, the pooling layers may down sample the output from the convolution layers by dividing the output from the convolution layers into one or more pooling regions and computing the maximum or average of each region.

In some embodiments, trained model 124 may include a flattening layer to convert the output from the pooling layers to form input for the one or more fully connected layers. The features extracted by the convolution layers and pooling layers are classified by the one or more fully connected layers to produce the output of trained model 124. In some embodiments, trained model 124 produces a binary output. For example, an output of one may indicate the presence of a shared pattern, while an output of zero may indicate that there is no shared pattern. In other embodiments, trained model 124 may produce a single numerical output (e.g., percentage) indicating of the likelihood of a shared pattern. In other embodiments, trained model 124 may produce two outputs, one indicating the likelihood of a shared pattern and another indicating the likelihood of no shared pattern.

Figure 3:
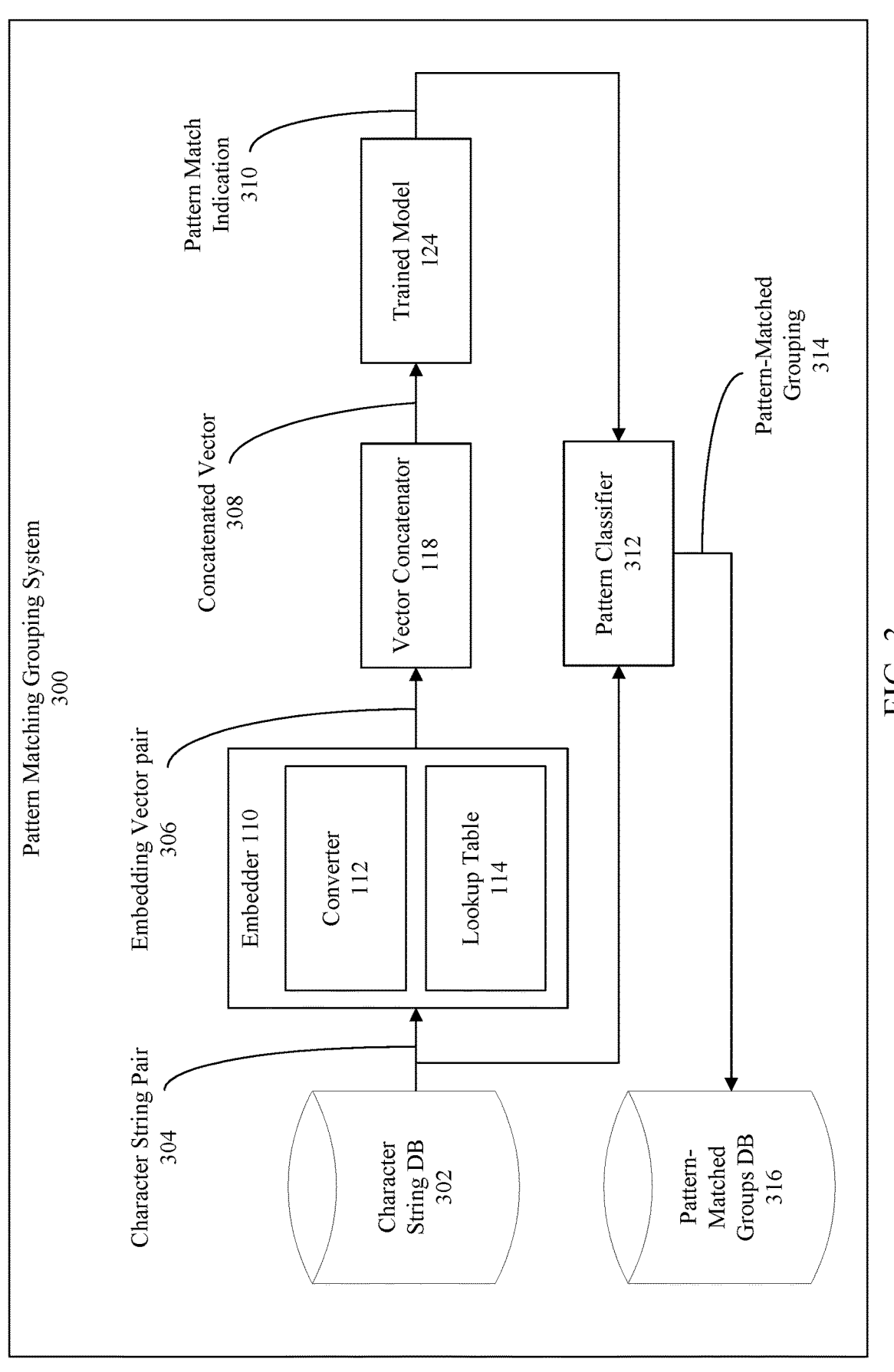
FIG. 3 shows a block diagram of an example system for using a machine learning model to group character strings that share a pattern, in accordance with an embodiment.

To further illustrate the aforementioned systems and methods, FIG. 3 will now be described. In particular, FIG. 3 is a block diagram of an example pattern grouping system 300 for using a machine learning model to group character strings that share a pattern, in accordance with an embodiment. As opposed to the model training phase described above with respect to FIGS. 1 and 2, pattern grouping system 300 relates to an inference phase where pattern matching is performed by a trained model to infer pattern matches between input character strings. In some embodiments, pattern grouping system 300 may share one or more computing devices with pattern matching model training system 100, although in other embodiments, pattern matching model training system 100 and pattern grouping system 300 may be implemented in completely separate computing devices. As shown in FIG. 3, pattern grouping system 300 includes embedder 110, vector concatenator 118, and trained model 124, as described in relation to FIG. 1, and further includes a character string database 302, a pattern classifier 312, and a pattern-matched groups database 316. These components of pattern grouping system 300 are described in further detail as follows.

To further illustrate the foregoing features of pattern grouping system 300, FIG. 4 is described. FIG. 4 depicts a flowchart 400 of a process for using a machine learning model to group character strings that share a pattern, in accordance with an embodiment. Pattern grouping system 300 may operate according to flowchart 400 in embodiments. Note that not all steps of flowchart 400 need be performed in embodiments. Further structural and operational embodiments will be apparent to persons skilled in the relevant art(s) based on the following description of FIG. 4. FIG. 4 is described as follows with reference to pattern grouping system 300 of FIG. 3.

Flowchart 400 begins at step 402. In step 402, a plurality of character strings are received. For example, as shown in FIG. 3, embedder 110 receives a plurality of character strings from character strings database 302. Character strings database 302 stores and provides character strings that may be associated with an entity (e.g., company, user, tenant, user group, service, etc.). For example, character strings database 302 may include usernames associated with departments or groups of an organization. Such usernames may be legitimate, and some may be created for malicious purposes (e.g., hacking). Usernames may be input to pattern grouping system 300 to determine one or more usernames that do not share a pattern with others of the usernames, and thus may have been input for malicious purposes. In other embodiments, other types of character strings (e.g., serial numbers or model numbers) may be maintained in database 302 for the purpose of pattern matching according to system 300.

As such, in embodiments, at least some of the character strings in character strings database 302 may share an attribute (e.g., a pattern). For example, usernames following a pattern may include concatenations of the user's first name, followed by their last name, and followed by a number (e.g., jimbrown88), or may follow any other suitable pattern. In some embodiments, the plurality of character strings may each comprise characters comprising one or more of ASCII characters, Unicode characters, UTF-8 characters, or any other characters. In some embodiments, the plurality of character strings may include automatically generated usernames associated with the entity, and thus are more likely to have been generated according to a pattern. Usernames that do not conform to a pattern are more likely to have been created by hackers or other entities for malicious purposes. As shown in FIG. 3, character strings database 302 provides character string pair 304 to embedder 110 for comparison (pattern matching).

In particular, pattern-matched groups database 316 of FIG. 3 is configured to store groups of character strings that share a pattern. For example, based on comparison by a trained model, such as trained model 124, usernames that share a pattern are identified and grouped in database 316. In embodiments, a group of character strings in database 316 may include all character strings of character strings database 302 that share a pattern or may be limited to character strings in a particular entity (e.g., company or department) that share a pattern. Pattern-matched groups database 316 may include any number of groups, where each group includes character strings that share a common corresponding pattern. In some embodiments, a particular entity (e.g., company or department) may be associated with a plurality of groups in pattern-matched groups database 316. For example, a particular entity may use multiple patterns to generate usernames resulting in a plurality of groups corresponding to each of the multiple patterns.

In step 404, each character string of the plurality of the character strings is pairwise compared to others of the plurality of character strings. A pairwise comparison of character strings entails comparing two (e.g., first and second) character strings to each other. With reference to FIG. 3, in step 404, the character strings received from character string database 302 are pairwise compared (i.e., in each comparison, two character strings are compared to each other) by trained model 124. In particular, trained model 124 compares each character string of the received plurality of character strings with at least one other character string of the received plurality of character strings to determine whether they share a pattern (or multiple patterns). For example, trained model 124 may compare first and second character strings of character string pair 304 to infer whether a pattern match exists between them. In some embodiments, the plurality of character strings that undergo pairwise comparison may represent an entire dataset (e.g., username database), while in other embodiments, the plurality of character strings may be a subset (e.g., a representative and/or random sample) of the entire dataset. In one embodiment, trained model 124 receives character string pair 304 directly from database 302, while in another embodiment, character string pair 304 is first processed to be normalized prior to input to trained model 124. For instance, as shown in FIG. 3, to normalize the input, embedder 110 may be present to generate an embedded vector pair 306 based on character string pair 304 (as described elsewhere herein), and vector concatenator 118 may be present to generate a concatenated vector 308 based on embedded vector pair 306 (as described elsewhere herein). Concatenated vector 308 is a normalized version of character string pair 304 and is received by trained model 124 as input for pattern matching.

In an embodiment, steps 406 and 408 may be performed as sub-steps of step 404. In another embodiment, alternative steps may be performed to compare character string pair 304. Steps 406 and 408 of step 404 are described as follows. Upon completion of step 404, operation proceeds to step 410.

In step 406, each pair of character strings is provided to the trained model. For example, vector concatenator 118 may provide concatenated vector 308, representing a pair of character strings, to trained model 124 for comparison. As shown in FIG. 3, trained model 124 receives concatenated vector 308. As described above, trained model 124 is configured to determine a pattern match likelihood for the pair of characters strings of concatenated vector 308.

In a 1D-CNN embodiment, trained model 124 may compare concatenated vector 308 using one or more convolutional layers, one or more pooling layers, and one or more fully connected layers. Trained model 124 may additionally process concatenated vector 308 with a flatten layer. Each convolution layer applies sliding convolution filters to the concatenated vector 308 by moving the filters along the concatenated vector 308 and computing the dot product of the weights. In some embodiments, a bias may be added to the dot product. In some embodiments, the one or more convolution layers may differ in some respects. For example, the convolution layers may differ in one or more parameters, such as kernel size. The output from the one or more convolution layers may be provided to one or more pooling layers. The pooling layers may include, for example, a max pooling layer or an average pooling layer. The pooling layers may down sample the output from the convolution layers by dividing the output from the convolution layers into one or more pooling regions and computing the maximum or average of each region. In some embodiments, trained model 124 may further process concatenated vector 308 by a flattening layer to convert the output from the pooling layers into an input for the one or more fully connected layers. The features extracted by the convolution layers and pooling layers are classified by the one or more fully connected layers to produce a pattern match indication 310.

In step 408, a pattern match indication is received from the trained model. For example, pattern classifier 312 may receive one or more pattern match indications 310 generated by trained model 124 that correspond to each received character string pair 304. A pattern match indication 310 indicates whether a corresponding pair of character strings shares a pattern. In some embodiments, pattern match indication 310 is a binary output. For example, an output of "1" may indicate the presence of a shared pattern by the character strings of the concatenated vector pair (corresponding to the pair of character strings), while an output of "0" may indicate no pattern is shared by the character strings of the concatenated vector pair. In other embodiments, pattern match indication 310 is a single numerical output (e.g., percentage) indicating of the likelihood of a shared pattern by the character strings of the concatenated vector pair. In other embodiments, pattern match indication 310 may include two outputs, one indicating the likelihood of a shared pattern and another indicating the likelihood of no shared pattern.

In step 410, a character string pair is grouped together if a corresponding pattern match indication indicates a pattern match. For each pattern match indication 310 that indicates a positive pattern match, pattern classifier 312 groups the corresponding pair of character strings into a corresponding pattern-matched grouping 314, which pattern classifier 312 transmits to pattern-matched groups database 316 for storage in the corresponding group. In some embodiments, system 300 may stop comparing character string pairs when the number of character strings in pattern-matched grouping 314 reaches a predetermined threshold (e.g., a group of 5 character strings). However, in other embodiments, comparison continues until all character string pairs 304 are processed. Character strings are grouped in the same pattern-matched group as long as each character string shares a pattern with every other character string in the pattern-matched group. In some embodiments, the character strings are grouped in the same pattern-matched group without determining the actual pattern that is shared by the group.

Note that once one or more pattern-matched groups are established, such as pattern-matched grouping 314, further character strings may be received that are processed by trained model 124 to determine whether they match the pattern of one or more groups. In the case a character string is determined to not match the pattern of a group, a remedial action may be taken. For instance, a username that does not match an established group of usernames matching a pattern may be determined to have been created for malicious purposes, and may be deactivated, blocked, or otherwise prevented from causing harm. As another example, a serial number that does not match an established group of serial numbers matching a pattern may be determined to be fake, and any attempt to register a product using the serial number may be blocked.

Figure 5:
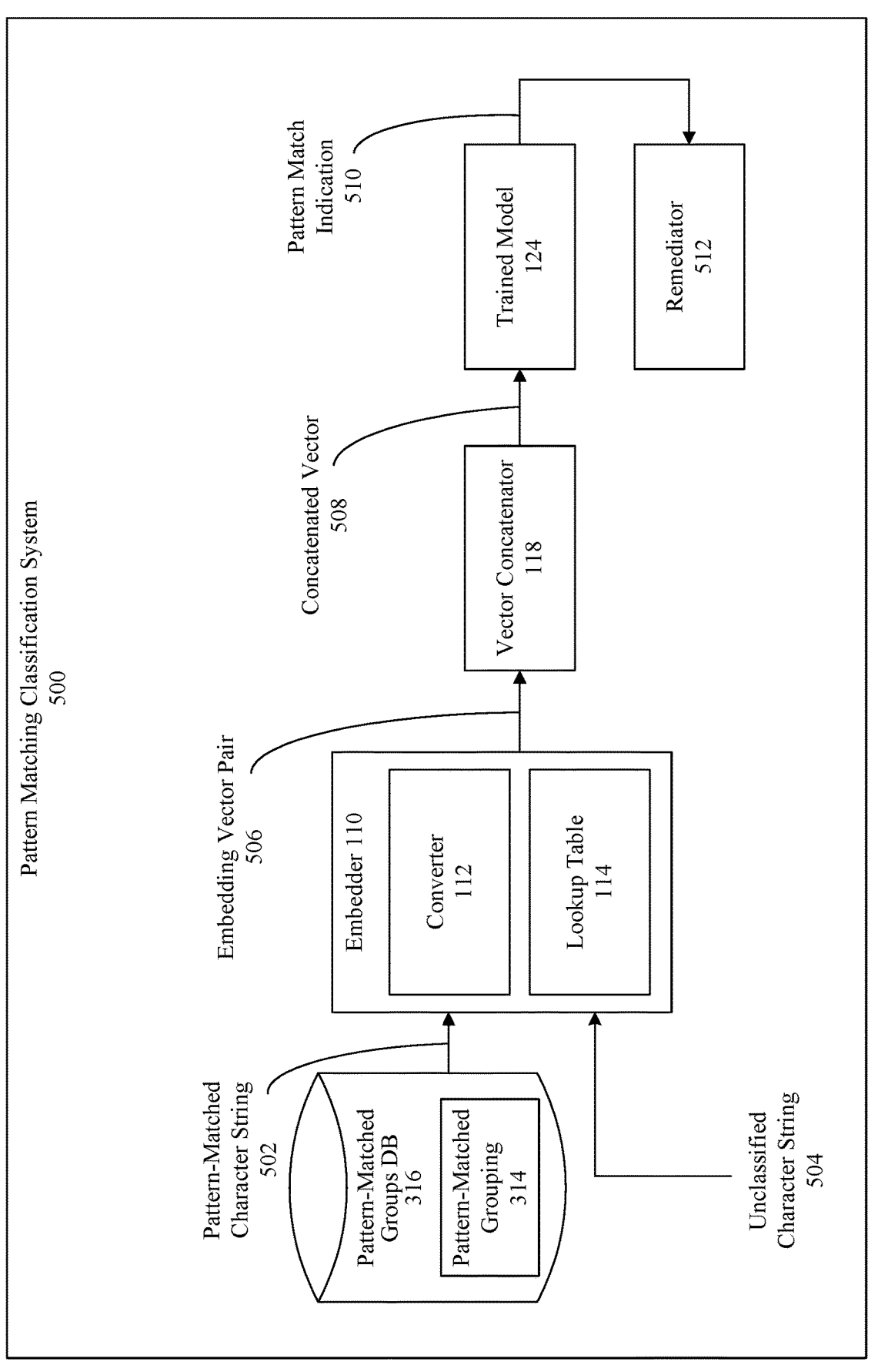
FIG. 5 shows a block diagram of an example system for using a machine learning model to classify an unclassified character string, in accordance with an embodiment.

In particular, FIG. 5 is a block diagram of an example pattern classification system 500 for using a machine learning model to perform remediation with regard to an input character string determined to not match a group pattern, in accordance with an embodiment. Pattern classification system 500 may be implemented separately or in one or more computing devices along with one or more of systems 100, and 300. As shown in FIG. 5, pattern classification system 500 includes embedder 110, vector concatenator 118, and trained model 124 described in relation to FIG. 1, and pattern-matched groups database 316 described in relation to FIG. 3, and further includes a remediator 512. For illustrative purposes, system 500 is described in conjunction with FIG. 6. FIG. 6 depicts a flowchart 600 of a process for using a machine learning model to classify an unclassified character string, in accordance with an embodiment. Pattern classification system 500 may operate according to flowchart 600 in embodiments. Note that not all steps of flowchart 600 need be performed in embodiments. Further structural and operational embodiments will be apparent to persons skilled in the relevant art(s) based on the following description of FIGS. 5 and 6.

Flowchart 600 begins at step 602. In step 602, an unclassified character string is received. For example, embedder 110 may receive an unclassified character string 504. In some embodiments, embedder 110 may also receive one or more pattern-matched character strings 502 from pattern-matched grouping 314 stored in pattern-matched groups database 316.

In step 604, the unclassified character string is pairwise compared to each character string in a pattern-matched group. For example, as shown in FIG. 5, trained model 124 may receive unclassified character string 504 and pattern-matched character string 502 directly, or after normalization via embedder 110 and vector concatenator 118 as concatenated vector 508. Trained model 124 is configured to generate a pattern match indication 510 that is indicative of whether unclassified character string 504 and pattern-matched character string 502 share a pattern. In some embodiments, step 604 is performed such that each character string included in a group, such as pattern-matched grouping 314 stored in pattern-matched groups database 316, is pairwise compared with unclassified character string 504 to determine whether any matches are found. In other embodiments, step 604 is performed until a predetermined threshold number of matches are found. For example, when pattern-matched grouping 314 contains a large number of character strings, a threshold number of matches (e.g., five) may be sufficient to determine that unclassified character string 504 shares a pattern with the pattern-matched grouping 314. In some embodiments, step 604 is performed until a negative pattern match indication is received. For example, when unclassified character string 504 does not share a pattern with one character string of pattern-matched grouping 314, it can be inferred that it does not match the pattern associated with pattern-matched grouping 314. Comparing unclassified character string 504 to each character string in a pattern-matched grouping 314 provides an indication of whether unclassified character string 504 shares a pattern with the character strings in pattern-matched grouping 314 without determining the actual pattern.

In step 606, an action is performed responsive to the unclassified character string not matching a pattern associated with the pattern-matched group. For example, remediator 512 may receive one or more pattern match indications 510 from trained model 124, with each pattern match indication 510 indicating whether unclassified character string 504 shares a pattern with a corresponding pattern-matched character string 502 of pattern-matched grouping 314. Remediator 512 is configured to perform an action responsive to the unclassified character string not matching the group pattern. For instance, in an embodiment, unclassified character string 504 must be determined to share a pattern with a predetermined threshold number of pattern-matched character strings 502 in pattern-matched grouping 314 for remediator 512 to determine unclassified character string 504 shares a pattern with pattern-matched grouping 314. If no matches are found, or a number of matches is found that is less than the predetermined threshold number, remediator 512 determines unclassified character string 504 fails to share a pattern with pattern-matched grouping 314. Any type of action may be performed when an input character string is determined to not share a pattern with grouping 314. For instance, in the embodiment where character strings are usernames, the action may include one or more of: preventing the creation of an account using unclassified character string 504, providing an alert to a user or administrator associated with the pattern-matched grouping 314, etc. In other embodiments, additional and/or alternative remedial actions may be performed, including, but not limited to, blocking the device attempting to create the account, sandboxing the entity attempting to create the account using the unclassified character string, creating log entries, modifying the frequency and/or type of monitoring performed, and any other similar remedial action known to those of ordinary skill in the art. In embodiments where the character strings are serial numbers, remediator 512 may prevent the user from registering a product using unclassified character string 504.

III. Example Mobile Device and Computer System Implementation

The systems and methods described above in reference to FIGS. 1-6, pattern matching model training system 100, string generator 102, pattern-matched string generator 104, non-pattern-matched string generator 106, embedder 110, converter 112, lookup table 114, vector concatenator 118, model trainer 122, trained model 124, pattern grouping system 300, character string database 302, pattern classifier 312, pattern-matched groups database 316, pattern classification system 500, remediator 512, and/or each of the components described therein, and/or the steps of flowcharts 200, 400, and/or 600 may be implemented in hardware, or hardware combined with one or both of software and/or firmware. For example, pattern matching model training system 100, string generator 102, pattern-matched string generator 104, non-pattern-matched string generator 106, embedder 110, converter 112, lookup table 114, vector concatenator 118, model trainer 122, trained model 124, pattern grouping system 300, character string database 302, pattern classifier 312, pattern-matched groups database 316, pattern classification system 500, remediator 512, and/or each of the components described therein, and/or the steps of flowcharts 200, 400, and/or 600 may be each implemented as computer program code/instructions configured to be executed in one or more processors and stored in a computer readable storage medium. Alternatively, pattern matching model training system 100, string generator 102, pattern-matched string generator 104, non-pattern-matched string generator 106, embedder 110, converter 112, lookup table 114, vector concatenator 118, model trainer 122, trained model 124, pattern grouping system 300, character string database 302, pattern classifier 312, pattern-matched groups database 316, pattern classification system 500, remediator 512, and/or each of the components described therein, and/or the steps of flowcharts 200, 400, and/or 600 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
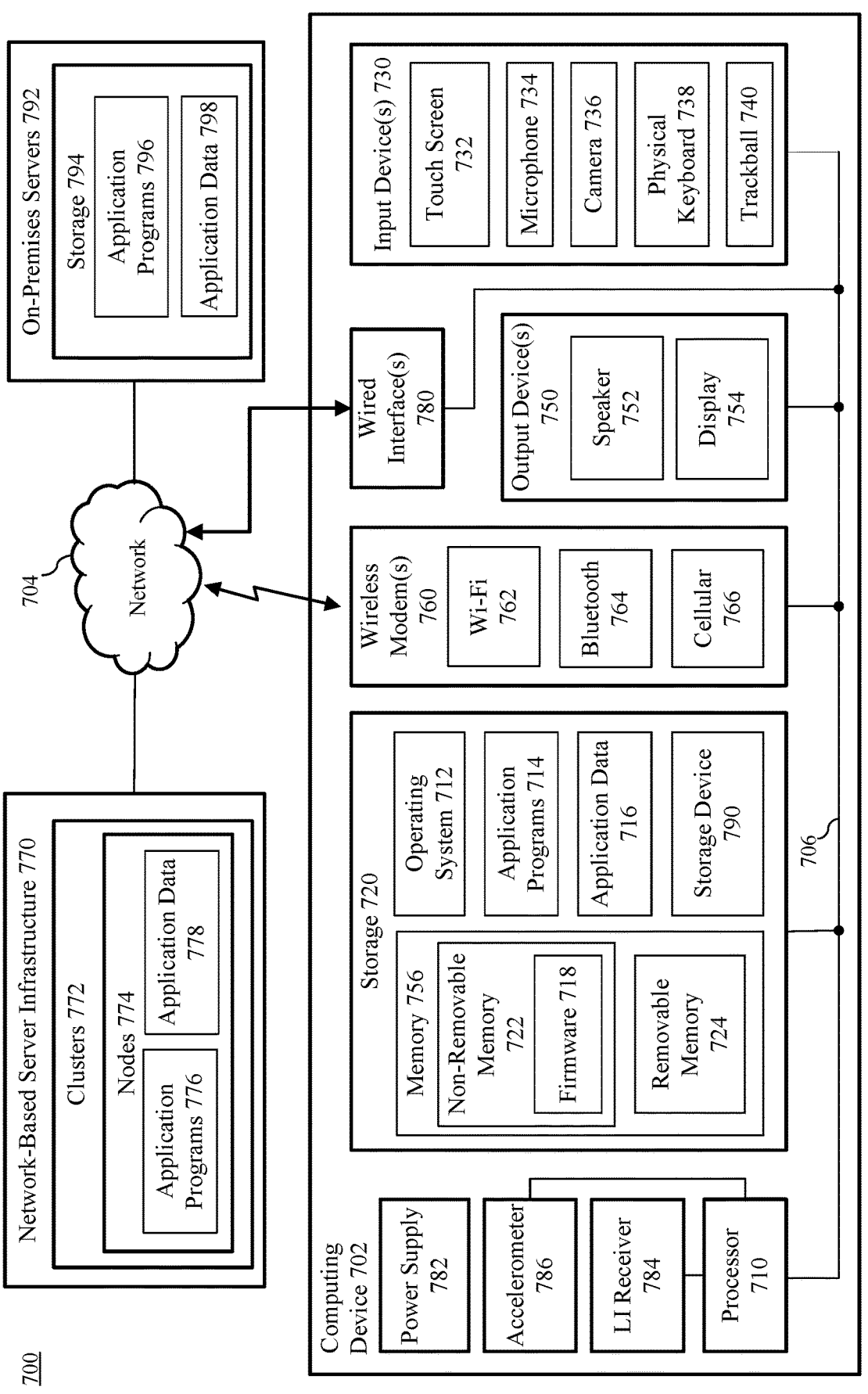
FIG. 7 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 7. FIG. 7 shows a block diagram of an exemplary computing environment 700 that includes a computing device 702. In some embodiments, computing device 702 is communicatively coupled with devices (not shown in FIG. 7) external to computing environment 700 via network 704. Network 704 comprises one or more networks such as local area networks (LANs), wide area networks (WANs), enterprise networks, the Internet, etc., and may include one or more wired and/or wireless portions. Network 704 may additionally or alternatively include a cellular network for cellular communications. Computing device 702 is described in detail as follows Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications" or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of pattern matching model training system 100, string generator 102, pattern-matched string generator 104, non-pattern-matched string generator 106, embedder 110, converter 112, lookup table 114, vector concatenator 118, model trainer 122, trained model 124, pattern grouping system 300, character string database 302, pattern classifier 312, pattern-matched groups database 316, pattern classification system 500, remediator 512, and/or each of the components described therein, along with any components and/or sub-components thereof, as well as the flowcharts/flow diagrams (e.g., flowcharts 200, 400, and/or 600) described herein, including portions thereof, and/or further examples described herein.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a user interface. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port). LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 772 may be a datacenter in a distributed collection of datacenters. In embodiments, exemplary computing environment 700 comprises part of a cloud-based platform such as Amazon Web Services® of Amazon Web Services, Inc. or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

IV. Additional Example Embodiments

In an embodiment, a method for determining whether a character string matches a pattern comprises: receiving a plurality of character strings; comparing, using a trained machine learning model, each of the plurality of character strings pairwise with others of the plurality of character strings to determine whether each pair of character strings share a pattern; grouping, into a group, pairwise-compared character strings determined to share a pattern; and performing an action responsive to determining that an unclassified character string does not match the pattern associated with the group.

In an embodiment, the performing is preceded by: receiving the unclassified character string; and comparing, using the trained machine learning model, the unclassified character string pairwise with each character string in the group to determine whether the unclassified character string matches the pattern associated with the group.

In an embodiment, performing an action includes one or more of: preventing the creation of an account associated with the unclassified character string; or providing an alert to a user or administrator.

In an embodiment, comparing each of the plurality of character strings pairwise includes, for each pair of character strings from the plurality of character strings: converting the pair of character strings to a corresponding pair of embedding vectors; combining the pair of embedding vectors; providing the combined pair of embedding vectors to the trained machine learning; and receiving a pattern match indication from the trained machine learning model that indicates whether the pair of character strings share pattern.

In an embodiment, converting the pair of character strings to the corresponding pair of embedding vectors includes: mapping each character of the pair of character strings to a corresponding numeric vector using a lookup table; and padding, when at least one of the pair of character strings is shorter than a predetermined length, the corresponding at least one of the pair of embedding vectors to the predetermined length.

In an embodiment, the trained machine learning model is based on one or more of: a convolutional neural network (CNN); a deep learning neural network; a transformer neural network; a recurrent neural network; or a long short-term memory (LSTM) network.

In an embodiment, the trained machine learning model is trained using labeled pairs of randomly generated character strings each comprising characters from one or more of: ASCII characters; Unicode characters; or UTF-8 characters.

In an embodiment, a system for determining whether a character string matches a pattern includes: a processor; and a memory having computer-executable instructions stored thereon that, when executed by the processor, cause the processor to: receive a plurality of character strings; compare, using a trained machine learning model, each of the plurality of character strings pairwise with others of the plurality of character strings to determine whether each pair of character strings share a pattern; and group character strings of pairs determined to share a pattern into a group.

In an embodiment, the instructions, when executed by the processor, further cause the processor to: receive an unclassified character string; compare, using the trained machine learning model, the unclassified character string pairwise with each character string in the group to determine whether the unclassified character string matches the pattern associated with the group; and perform an action responsive to determining that the unclassified character string does not match the pattern associated with the group.

In an embodiment, performing an action includes one or more of: preventing the creation of an account associated with the unclassified character string; or providing an alert to a user or administrator.

In an embodiment, comparing each of the plurality of character strings pairwise includes, for each pair of character strings from the plurality of character strings: converting the pair of character strings to a corresponding pair of embedding vectors; combining the pair of embedding vectors;

providing the combined pair of embedding vectors to the trained machine learning; and receiving a pattern match indication from the trained machine learning model that indicates whether the pair of character strings share pattern.

In an embodiment, converting the pair of character strings to the corresponding pair of embedding vectors includes mapping each character of the pair of character strings to a corresponding numeric vector using a lookup table; and padding, when at least one of the pair of character strings is shorter than a predetermined length, the corresponding at least one of the pair of embedding vectors to the predetermined length.

In an embodiment, the trained machine learning model is based on one or more of: a convolutional neural network (CNN); a deep learning neural network; a transformer neural network; a recurrent neural network; or a long short-term memory (LSTM) network.

In an embodiment, a method for generating a pattern matcher includes: receiving training data that includes first and second character strings and a label; converting the first and second character strings to corresponding first and second embedding vectors; combining the first and second embedding vectors; providing the combined first and second embedding vectors and the label to a model trainer; and receiving from the model trainer a trained machine learning model configured to pattern match input character string pairs.

In an embodiment, the method further includes: receiving a plurality of character strings; comparing, using the trained machine learning model, each of the plurality of character strings pairwise with others of the plurality of character strings to determine whether each pair of character strings share a pattern; and grouping character strings of pairs determined to share a pattern into a group.

In an embodiment, the method further includes: receiving an unclassified character string; comparing, using the trained machine learning model, the unclassified character string pairwise with each character string in the group to determine whether the unclassified character string matches the pattern associated with the group; and performing an action responsive to determining that the unclassified character string does not match the pattern associated with the group.

In an embodiment, performing an action includes one or more of: preventing the creation of an account associated with the unclassified character string; or providing an alert to a user or administrator.

In an embodiment, comparing each of the plurality of character strings pairwise includes, for each pair of character strings from the plurality of character strings: converting the pair of character strings to a corresponding pair of embedding vectors; combining the pair of embedding vectors; providing the combined pair of embedding vectors to the trained machine learning; and receiving a pattern match indication from the trained machine learning model that indicates whether the pair of character strings share pattern.

In an embodiment, converting the first and second character strings to the corresponding first and second embedding vectors includes: mapping each character of the first and second character strings to a corresponding numeric vector using a lookup table; and padding, when at least one of the first or second character strings is shorter than a predetermined length, the corresponding at least one of the first or second embedding vectors to the predetermined length.

In an embodiment, the trained machine learning model is based on one or more of: a convolutional neural network (CNN); a deep learning neural network; a transformer neural network; a recurrent neural network; or a long short-term memory (LSTM) network.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method for determining whether a username matches a pattern, comprising:
   receiving a plurality of usernames;
   comparing, using a trained machine learning model, each of the plurality of usernames pairwise with others of the plurality of usernames to determine whether each pair of usernames share a pattern;
   grouping, into a group, pairwise-compared usernames determined to share a pattern;
   receiving an unclassified username;
   determining that the unclassified username does not match the pattern associated with the group; and
   responsive to determining that the unclassified username does not match the pattern associated with the group, preventing the creation of an account associated with the unclassified username.

2. The method of claim 1, wherein said determining that the unclassified username does not match the pattern comprises:
   comparing, using the trained machine learning model, the unclassified username pairwise with each username in the group to determine whether the unclassified e username matches the pattern associated with the group.

3. The method of claim 2, further comprising:
providing an alert to a user or administrator.

4. The method of claim 1, wherein said comparing each of the plurality of usernames pairwise comprises:
for each pair of usernames from the plurality of usernames:
converting the pair of usernames to a corresponding pair of embedding vectors;
combining the pair of embedding vectors;
providing the combined pair of embedding vectors to the trained machine learning model; and
receiving a pattern match indication from the trained machine learning model that indicates whether the pair of usernames share pattern.

5. The method of claim 4, wherein said converting the pair of usernames to the corresponding pair of embedding vectors comprises:
mapping each character of the pair of usernames to a corresponding numeric vector using a lookup table; and
padding, when at least one of the pair of usernames is shorter than a predetermined length, the corresponding at least one of the pair of embedding vectors to the predetermined length.

6. The method of claim 1, wherein the trained machine learning model is based on one or more of:
a convolutional neural network (CNN);
a deep learning neural network;
a transformer neural network;
a recurrent neural network (RNN); or
a long short-term memory (LSTM) network.

7. The method of claim 1, wherein the trained machine learning model is trained using labeled pairs of randomly generated character strings each comprising characters from one or more of:
ASCII characters;
Unicode characters; or
UTF-8 characters.

8. A system for determining whether a username matches a pattern, comprising:
a processor; and
a memory having computer-executable instructions stored thereon that, when executed by the processor, cause the processor to:
receive a plurality of usernames;
compare, using a trained machine learning model, each of the plurality of usernames pairwise with others of the plurality of usernames to determine whether each pair of usernames share a pattern;
group pairwise-compared serial numbers determined to share a pattern;
receive an unclassified username;
determine that the unclassified username does not match the pattern associated with the group; and
responsive to determining that the unclassified username does not match the pattern associated with the group, prevent the creation of an account associated with the unclassified username.

9. The system of claim 8, wherein, to determine that the unclassified username does not match the pattern, the instructions, when executed by the processor, cause the processor to:
compare, using the trained machine learning model, the unclassified username pairwise with each username in the group to determine whether the unclassified username matches the pattern associated with the group.

10. The system of claim 9, wherein the instructions, when executed by the processor, further cause the processor to:
provide an alert to a user or administrator.

11. The system of claim 9, wherein said comparing each of the plurality of usernames pairwise comprises:
for each pair of usernames from the plurality of usernames:
converting the pair of usernames to a corresponding pair of embedding vectors;
combining the pair of embedding vectors;
providing the combined pair of embedding vectors to the trained machine learning model; and
receiving a pattern match indication from the trained machine learning model that indicates whether the pair of usernames share pattern.

12. The system of claim 11, wherein said converting the pair of usernames to the corresponding pair of embedding vectors comprises:
mapping each character of the pair of usernames to a corresponding numeric vector using a lookup table; and
padding, when at least one of the pair of usernames is shorter than a predetermined length, the corresponding at least one of the pair of embedding vectors to the predetermined length.

13. The system of claim 8, wherein the trained machine learning model is based on one or more of:
a convolutional neural network (CNN);
a deep learning neural network;
a transformer neural network;
a recurrent neural network (RNN); or
a long short-term memory (LSTM) network.

14. A computer-readable storage medium comprising computer-executable instructions stored thereon that, when executed by a processor, cause the processor to:
receive a plurality of usernames;
compare, using a trained machine learning model, each of the plurality of usernames pairwise with others of the plurality of usernames to determine whether each pair of usernames share a pattern;
group pairwise-compared serial numbers determined to share a pattern;
receive an unclassified username;
determine that the unclassified username does not match the pattern associated with the group; and
responsive to determining that the unclassified username does not match the pattern associated with the group, prevent the creation of an account associated with the unclassified username.

15. The computer-readable storage medium of claim 14, wherein, to determine that the unclassified username does not match the pattern, the instructions, when executed by the processor, cause the processor to:
compare, using the trained machine learning model, the unclassified username pairwise with each username in the group to determine whether the unclassified username matches the pattern associated with the group.

16. The computer-readable storage medium of claim 15, wherein the instructions, when executed by the processor, further cause the processor to:
provide an alert to a user or administrator.

17. The computer-readable storage medium of claim 15, wherein said comparing each of the plurality of usernames pairwise comprises:
for each pair of usernames from the plurality of usernames:

converting the pair of usernames to a corresponding pair of embedding vectors;

combining the pair of embedding vectors;

providing the combined pair of embedding vectors to the trained machine learning model; and receiving a pattern match indication from the trained machine learning model that indicates whether the pair of usernames share pattern.

18. The computer-readable storage medium of claim 17, wherein said converting the pair of usernames to the corresponding pair of embedding vectors comprises:

mapping each character of the pair of usernames to a corresponding numeric vector using a lookup table; and padding, when at least one of the pair of usernames is shorter than a predetermined length, the corresponding at least one of the pair of embedding vectors to the predetermined length.

19. The computer-readable storage medium of claim 14, wherein the trained machine learning model is based on one or more of:

a convolutional neural network (CNN);

a deep learning neural network;

a transformer neural network;

a recurrent neural network (RNN); or a long short-term memory (LSTM) network.

20. The computer-readable storage medium of claim 14, wherein the trained machine learning model is trained using labeled pairs of randomly generated character strings each comprising characters from one or more of:

ASCII characters;

Unicode characters; or

UTF-8 characters.

\* \* \* \* \*